United States Patent
Roebelen, Jr. et al.

[11] 3,707,757
[45] Jan. 2, 1973

[54] IN-LINE REPLACEMENT TOOL
[75] Inventors: George J. Roebelen, Jr., Suffield; Thomas E. Fitzsimmons, Granby, both of Conn.
[73] Assignee: United Aircraft Corporation, East Hartford, Conn.
[22] Filed: Sept. 2, 1970
[21] Appl. No.: 68,832

[52] U.S. Cl. .................................................. 29/213
[51] Int. Cl. ............................................. B23p 19/04
[58] Field of Search ........ 29/157.1, 157.4, 156.4 WL, 29/213, 234, 434

[56] References Cited

UNITED STATES PATENTS

| | | | |
|---|---|---|---|
| 3,081,792 | 3/1963 | Hansen | 29/157.1 R |
| 2,300,914 | 4/1942 | Flindt | 29/234 |
| 2,867,034 | 1/1959 | Bowan | 29/213 |
| 3,561,090 | 2/1971 | Fritch | 29/213 |
| 3,103,739 | 9/1963 | Moog | 29/157.1 R |
| 3,587,156 | 6/1971 | Sorenson | 29/156.4 WL |
| 3,589,388 | 6/1971 | Haneline | 29/213 X |

Primary Examiner—Richard J. Herbst
Attorney—Norman Friedland

[57] ABSTRACT

This invention relates to a tool and a method for replacing component parts used in a fluid system whose parts are made in a cartridge fashion readily adaptable to receive the tool so as to keep fluid loss and atmosphere inclusion at a minimum.

7 Claims, 11 Drawing Figures

PATENTED JAN 2 1973
3,707,757
SHEET 1 OF 3
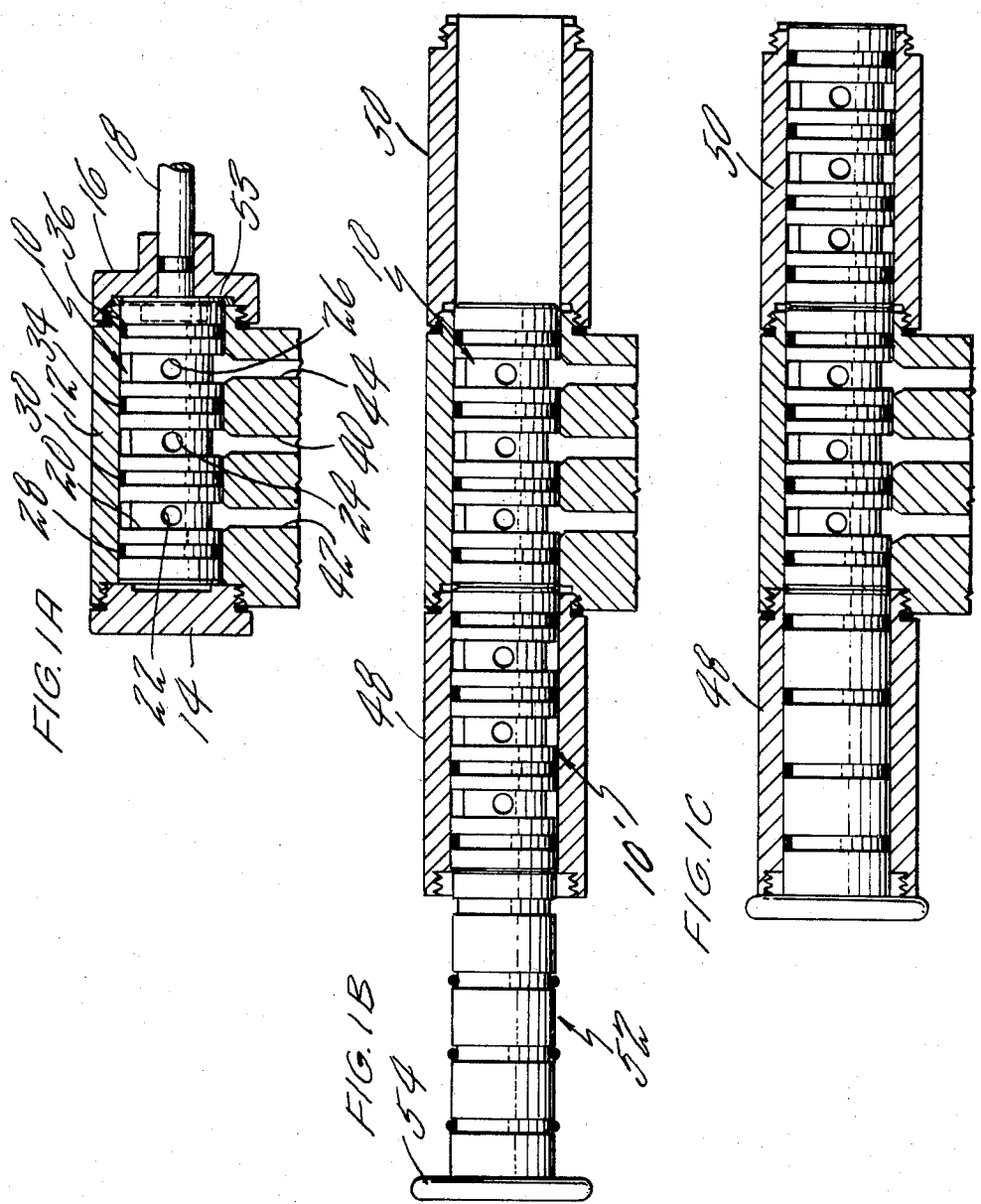
INVENTORS
GEORGE J. ROEBELEN, JR.
THOMAS E. FITZSIMMONS
BY Norman Friedland
ATTORNEY

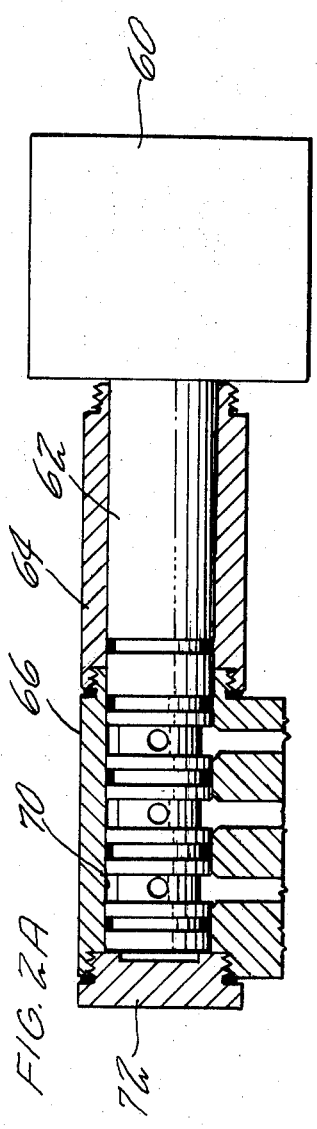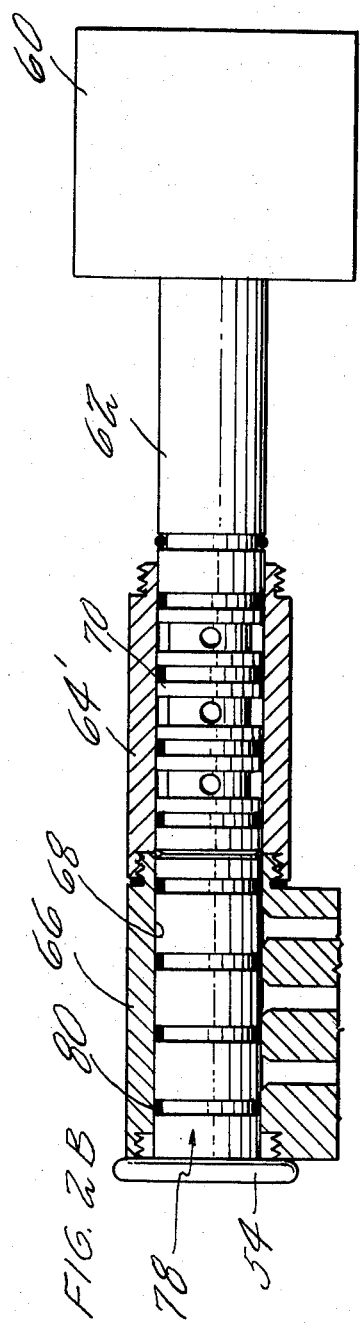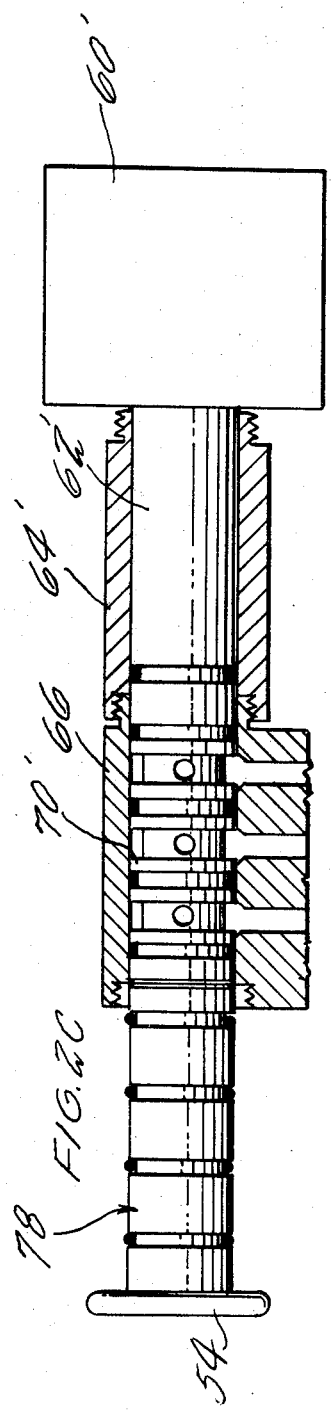

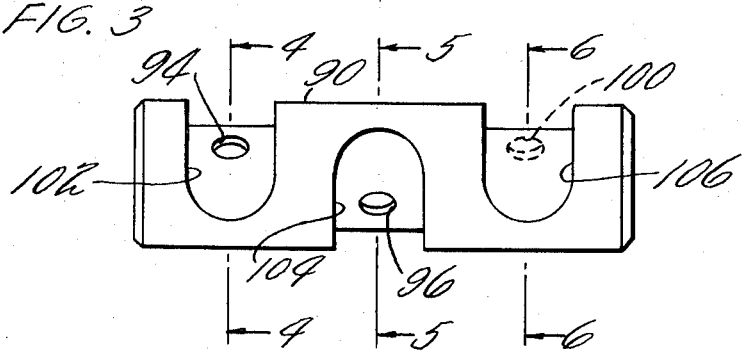
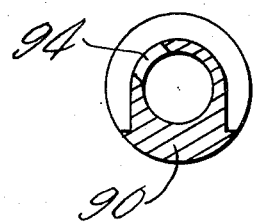
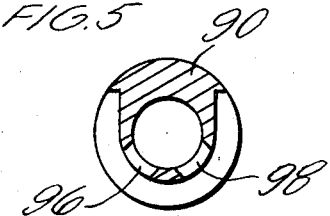
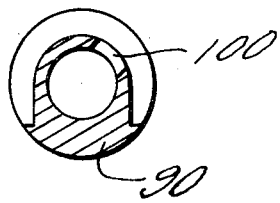
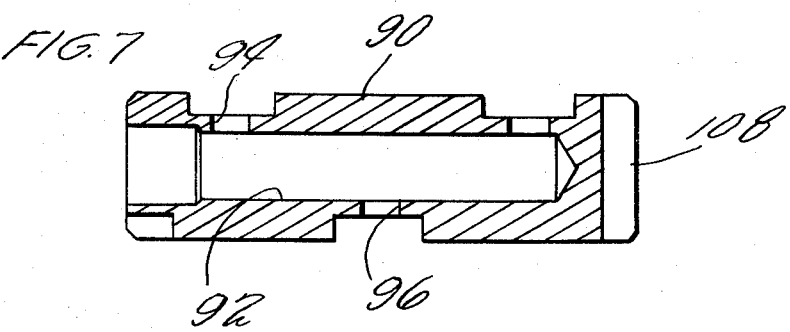

IN-LINE REPLACEMENT TOOL

BACKGROUND OF THE INVENTION

As is generally well known, the usual method for replacing component parts of a fluid, gaseous or liquid, system is by shutting down the entire system; removing the offending assembly, subassembly, or component from the system; and replacing the part with a good assembly, subassembly, or component. Once reassembled the system is turned on again. Obviously, such procedures require the necessary time to remove the assembly, subassembly, or component part to be replaced and in so doing it is generally the case that spillage of fluid from or leakage of air into the system is manifested.

I have found that I can accommodate the requirement for readily removable component parts by designing the system with cartridge-type sleeve components which utilize radial seals. In such a system the component which generally may be, but not limited thereto, shutoff valves, three-way valves, check valves, pumps, accumulators, gas separators, flow meters and the like is designed such that the interconnecting lines for these units terminate in a sleeve-covered cartridge which during normal usage is installed in a hard-plumbed housing. Thus, all that is necessary to remove a small component, such as a valve, is to remove the end caps, attach an empty sleeve to one side and a sleeve containing the spare component part to the other side of the housing and, with the use of a specially designed installation tool inserted in the sleeve, to force in the new part while rejecting the used component into the empty sleeve. The sleeves are then removed and the caps are then replaced. In this manner the spare components are always sealed by the sleeves of the housing and the loss fluid and included atmosphere is merely limited to a minute quantity of ullage contained between the faces of the components and between the sleeve and the housing. In a situation where a large component is to be replaced, such as a pump, heat exchanger, accumulator or the like, the end cap is removed and an installation tool is employed to displace the used component into a self-contained sleeve. The installation tool also serves to seal off the housing. The used component is removed with its self-contained sleeve and a spare component and its self-contained sleeve is substituted therefor. The spare component is inserted into the housing thereby rejecting the installation tool. The cap is replaced and as mentioned above, lost fluid is merely limited to a minute quantity of ullage.

While not limited thereto, this invention is particularly efficacious in a fluid system or subsystem for an outer-space vehicle. As is well known in a gravity-less environment it is difficult for one to manipulate tools and to fasten or tie down parts. This invention contemplates facilitating the task of manipulating the tool and simplifies the replacement of component parts. Additionally, not only can the components be removed and replaced from the system without loss of significant quantities of the contained fluid and without introducing significant quantities of atmospheric constituents therein, but since the removal method utilizes sleeve receptacles, these receptacles can be capped off so as to prevent atmospheric constituents to migrate into any spaces or voids in the new component and prevent the escapement into the atmosphere of the contained fluid that may be trapped in these spaces or voids.

SUMMARY OF THE INVENTION

The primary object of this invention is to provide improved means for replacing a component part of an assembly for a fluid system while limiting the spillage into the atmosphere and inclusion of atmosphere into the assembly to a minimum.

A still further object of this invention is to construct valves, pumps, accumulators and the like component parts in cartridge form, have its housing or portion within a system constructed to complement the cartridge, and being constructed so that there is access to the fluid lines of the component.

A still further object of this invention is to provide means to facilitate the removal of component parts in a fluid system while maintaining loss of and inclusion of fluid into and out of the unit when disassembling and replacing component parts.

A still further object of this invention is to construct valves, pumps and other component parts in cartridge form and assemble into a fluid system such that there is access fore and aft of the component and to provide removable end caps exposing the ends of said component parts and including a tool sized and shaped to complement the space occupied by the component.

A still further object of this invention is to provide a tool, similarly shaped to a component part to be replaced, sleeves adapted to receive the replacement part and the removed part, and adapted to fit on the end of and mounted in line with the housing bore supporting the component part, and said sleeve adapted to receive said tool, so that insertion of said tool positions the replacement part to displace the used part and that the tool and sleeve are removable as a unitary unit.

A still further object of this invention is to provide a method for removing component parts from a fluid system while maintaining loss of fluid from and inclusion of atmosphere into said system at a minimum, where the component parts are made in a cartridge and the part to be replaced is housed in a housing having accessible ends fore and aft of the component parts, and end caps adapted to seal the ends, comprising the steps of removing the end caps, replacing said end caps with a sleeve axially aligned within the bore containing the removable part, injecting a tool sized to occupy the space in said sleeve to position the new component part into the bore to replace the used component part, removing said sleeve and tool and replacing said end caps.

Other features and advantages will be apparent from the specification and claims and from the accompanying drawings which illustrate an embodiment of the invention.

BRIEF DESCRIPTION OF THE DRAWINGS

FIGS. 1A, 1B, and 1C are views partially in section and in side elevation illustrating a component part which may be a valve, and the sequence for replacing such component part.

FIGS. 2A, 2B, and 2C are views partially in section and in side elevation illustrating a component part which may be a pump, heat exchanger, accumulator or the like and the sequences of replacing said component part.

FIG. 3 is a side elevation view illustrating a typical valve internal element utilized with the structure shown in FIGS. 1A, 1B, and 1C.

FIG. 4 is a sectional view taken along line 4—4 of FIG. 3.

FIG. 5 is a sectional view taken along line 5—5 of FIG. 3.

FIG. 6 is a sectional view taken along line 6—6 of FIG. 3.

FIG. 7 is a sectional view of FIG. 3 taken along its longitudinal axis.

DESCRIPTION OF THE PREFERRED EMBODIMENT

Referring particularly to FIGS. 1A, 1B, and 1C the component part generally illustrated by reference numeral 10 is by means of radial O-seals frictionally fitted in an opened ended axial bore formed in housing 12. End caps 14 and 16 threadably secured to the housing, close off the end openings in housing 12 when the component is in use. A control shaft 18 extending through end cap 16 engages an inner valve element disposed in a central bore disposed in component 10 rotating it relative to the outer casing 20. The rotating valve element disposed in outer casing or plunger 20 is shown in FIG. 3 and will be described in more detail hereinafter. As is contemplated by the particular use of the device, flow passages disposed in housing 12 serve to conduct fluid into and out of the apertures 22, 24, and 26 disposed in the outer casing 20 of valve 10. As will be understood by one skilled in the art, the particular type of valve shown does not constitute an important feature of this invention and it is selected to merely illustrate one of many types of valves that may be employed utilizing the concept of this invention. It is, however, important to understand that the outer casing 20 is fitted into the bore of housing 12 and is suitably restrained by means of an anti-rotation key 53 from rotational movement. A plurality of seals which may be in the form of "O" rings 28, 30, 34, and 36 disposed in annular grooves formed in lands of outer casing 20 serve to prevent leakage of fluid from the adjacent passages as well as the escapement of fluid through the outer end caps.

Thus, in the illustration shown, the valve is a three-way valve which takes fluid from the central passage 40 and conducts it through either passage 42 or 44 depending on the rotation or movement of control shaft 18.

When desired to remove the component and in accordance with this invention, the end caps 14 and 16 are removed and replaced by sleeves 48 and 50; noting that sleeve 48 is connected fore of component 10 and sleeve 50 being connected aft of component 10. A replacement valve identical to component 10 and identified as component 10' is contained in sleeve 48. An installation tool 52 sized and dimensioned to generally conform to the configuration of the outer dimensions of the component consists of similarly spaced annular grooves adapted to receive radial seals similarly located to the seals disposed in the component 10 and 10' is inserted at the end of sleeve 48. By pushing at the platen 54 disposed on the end thereof, component 10' forces component 10 into the empty sleeve 50 as is shown in FIG. 1C. Both sleeves 48 and 50 are thereafter removed and the end caps 14 and 16 are replaced with the control shaft 18 properly indexed. The sleeve 50 now housing used component 10 may be capped off so as to prevent escapement of any trapped fluid into the atmosphere.

From the foregoing it is, therefore, obvious that the seals cooperating with the inner bore wall of housing 12 adjacent to the fluid passages serve to keep the fluid from escaping out and prevent inclusion of atmosphere therein when the component is replaced.

FIGS. 2A, 2B, and 2C illustrate another embodiment employing the technique of this invention wherein instead of a valve the component part is a pump, heat exchanger, accumulator or the like which is generally illustrated by the blank box 60. As shown in FIG. 2A, the component is illustrated in its assembled position having a cylindrical sleeve-like member 62 extending in the outer sleeve 64 suitably threaded to the housing 66. Sleeve-like member 62 may be integral with the component 60 and contains the necessary fluid-conductive passages, it being noted that it is frictionally secured to the outer sleeve 64 by means of the O-seal members. The element 70 is likewise frictionally held in bore 68 formed in housing 66 and contains suitable passages registering with the various passages located in housing 66 for conducting fluid into and out of component 60 via member 62. The particular design of the passages obviously will depend on the particular configuration of the unit which is being accommodated. The various designs are deemed to be within the skill of the ordinary mechanic and, therefore, details to this aspect are not considered necessary and for the sake of convenience and simplicity it is eliminated from the description hereof.

End cap 72 is threadably secured to the end of housing 66 and serves to seal off the end and simultaneously position element 70 relative to the various passages in the housing. To remove the component 60 to be replaced by new component requires the following steps. Cap 72 is removed and installation tool 78 is inserted therein forcing the unit rightwardly. It being noted that the "O" rings 80 mounted in suitable grooves in installation tool 78 serve to prevent the flow of fluid in the various passages in housing 66 from escaping as well as preventing the inclusion of atmosphere air therein. The unit 60 together with the cylinder member 62 and element 70 all being held to the housing 66 by the sleeve member 64 is removed therefrom and replaced by a new sleeve 64', a new replacement part 60', 62', and 70'. This entire unit is forced leftwardly as shown in FIG. 2C so that element 70' lines up with the various cooperating passages in housing 66. Tool 68 moved leftwardly when the new component is replaced can be easily removed and cap 72 thereupon is replaced completing the installation of the new component part 60'.

FIGS. 3 to 7 to be described next are included herein to illustrate a typical valve that may be utilized with this invention. As shown, a cylindrical valve spool element 90 is sized and dimensioned to fit into a central axial bore formed in outer casing 20. Valve spool element 90 is free to rotate by virtue of control shaft 18 therein but is suitably restrained from axial movement by restraining mechanism not shown, and has disposed therein a central axial flow passage 92 communicating with radial spaced holes 94, 96, 98, and 100. It being noted that radial holes 94 and 100 are circumferentially spaced 90° and hole 96 is in the same axial plane as hole 100 and hole 98 is in the same axial plane as hole 94. Holes 94, 96, 98, and 100 are adapted to register with openings 22, 24, and 26 in outer casing 20 except that opening 24 is actually located 180° circumferentially from position shown (FIG. 1A). Thus, rotation of element 90 will register hole 96 with opening 24 for conducting fluid in passage 40 to passage 92, through hole 100, opening 26 and to passage 44. Ninety degrees rotation of element 90 registers hole 98 with passage 40 and fluid is conducted to passage 92 through hole 94 and then to passage 42. Indexing stop (not shown) restricts total movement of element 90 to 90°. Rotational movement of element 90 to a position 45° from either flow position places the ports out of register and blocks off all flow.

Suitable seals may be utilized to prevent leakage adjacent to holes 94, 96, 98, and 100 and may take the form of a suitable seal material fitted into recesses 102, 104, and 106. Key slot 108 is formed on end of element 90 to accommodate a complementary key carried by control shaft 18.

What has been shown by this invention is a cartridge-type component readily removed by a self-sealing installation tool which is characterized by preventing the escapement of contained fluid and the inclusion of atmosphere into the system.. The component part being frictionally restrained and easily accessible facilitates the removal thereof which is of particular importance in outer-space system maintenance. A module of components built in this cartridge form can be designed to make up an entire or substantially entire system such as an environmental system for a spacecraft or of the portable type used by astronauts.

It should be understood that the invention is not limited to the particular embodiments shown and described herein, but that various changes and modifications may be made without departing from the spirit or scope of this novel concept as defined by the following claims.

We claim:

1. An in-line replacement tool adapted to remove a component of a fluid flow system while minimizing the loss of fluid in the system and preventing the inclusion of ambient including:
   a housing having open ended bore accessible at both ends and having a plurality of transverse passages being upstream and downstream thereof, so that fluid flows into and out of said bore through openings in a flow control member,
   a removable cap closing one end of said bore,
   a plunger fitting in said bore and having means therein establishing communication with said upstream and downstream passages,
   means for replacing said plunger including a sleeve having a bore therein to accept said plunger,
   means for securing said sleeve to said housing with the bores in alignment,
   said in-line replacement tool sized to snugly fit in the bore of said sleeve at the end opposite said sleeve for pushing said plunger therein, and
   a plurality of circumferential seal members axially spaced on said in-line replacement tool and the axial spacing being such that said seals are located fore and aft of each of said transverse passages for preventing fluid from escaping and atmosphere from ingressing into said housing.

2. Apparatus as claimed in claim 1 wherein said tool means includes a cylindrical member having its diameter and length corresponding to the diameter and length of said plunger.

3. A cartridge type of component for a fluid system, a housing having an open ended elongated bore accessible at both ends and having a plurality of transverse passages being upstream and downstream thereof, so that fluid flows into and out of said bore through openings in a flow control member,
   caps closing both ends of said bore,
   said flow control member fitting in said bore and having means therein establishing communication with said passages, and means disposed therein for rotating said member to control the flow through the passages,
   in-line replacement means for replacing said flow control member including a first sleeve having a bore therein to accept said flow control member,
   means for securing said first sleeve to said housing with the bore in alignment,
   a second sleeve having a bore therein for accommodating a replacement flow control member adapted to replace said flow control member,
   means for securing said second sleeve to said housing with the bores in alignment,
   an in-line replacement tool fitting in said bore at the end opposite said second sleeve for pushing said replacement flow control member concomitantly with said flow control member whereby said replacement flow control fits into the bore and said first sleeve, a plurality of circumferential seal members axially spaced on said in-line replacement tool and the axial spacing being such that said seals are located fore and aft of each of said transverse passages for preventing fluid from escaping and atmosphere from ingressing into said housing.

4. Apparatus as claimed in claim 3 wherein said flow control member includes a plurality of lands spaced between said ends of said bore and adjacent said passages.

5. Apparatus as claimed in claim 3 wherein said flow control member includes a plurality of radial seals fitted into annular grooves formed in said lands.

6. Apparatus as claimed in claim 3 wherein said in-line replacement tool means includes a cylindrical member having its diameter and length corresponding to the diameter and length of said flow control member.

7. An in-line replacement tool adapted to replace a plurality of cartridge type of components in a fluid flow system without loss of fluid from and inclusion of atmosphere in said system, each of said components having at least a portion thereof formed in an elongated cylindrical member fitted into a bore formed in a housing, said elongated bore having a plurality of flow communicating passages transverse of said bore and being upstream and downstream thereof, so that fluid flows into and out of said bore through openings in said cylindrical member, said in-line replacement tool being dimensioned to snugly fit into said bore and be coextensive therewith, a plurality of circumferential seal members axially spaced on said in-line replacement tool and the axial spacement being such that said seals are located fore and aft of each of said transverse passages.

* * * * *